US012414049B2

(12) United States Patent
Jung et al.

(10) Patent No.: US 12,414,049 B2
(45) Date of Patent: Sep. 9, 2025

(54) METHOD AND DEVICE FOR BACKING OFF COMMUNICATION POWER

(71) Applicant: SAMSUNG ELECTRONICS CO., LTD., Suwon-si (KR)

(72) Inventors: Youngsun Jung, Suwon-si (KR); Hanyeop Lee, Suwon-si (KR); Jinchul Choi, Suwon-si (KR); Gun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 417 days.

(21) Appl. No.: 17/982,252

(22) Filed: Nov. 7, 2022

(65) Prior Publication Data
US 2023/0088823 A1 Mar. 23, 2023

Related U.S. Application Data

(63) Continuation of application No. PCT/KR2022/013241, filed on Sep. 5, 2022.

(30) Foreign Application Priority Data

Sep. 23, 2021 (KR) .................. 10-2021-0125576

(51) Int. Cl.
*H04W 52/18* (2009.01)
*H04W 52/22* (2009.01)
*H04W 52/24* (2009.01)

(52) U.S. Cl.
CPC ....... *H04W 52/226* (2013.01); *H04W 52/245* (2013.01)

(58) Field of Classification Search
CPC ... H04W 52/22; H04W 52/226; H04W 52/24; H04W 52/245
See application file for complete search history.

(56) References Cited

U.S. PATENT DOCUMENTS

| 8,831,528 B2 * | 9/2014 | Shi | ...................... H04W 52/288 455/67.11 |
| 8,996,054 B2 * | 3/2015 | Kazmi | ................. H04B 1/3838 455/425 |

(Continued)

FOREIGN PATENT DOCUMENTS

| KR | 10-2012-0062357 | 6/2012 |
| KR | 10-2015-0052547 | 5/2015 |

(Continued)

OTHER PUBLICATIONS

PCT International Search Report dated Dec. 16, 2022 for PCT Application No. PCT/KR2022/013241.

*Primary Examiner* — Hai V Nguyen
(74) *Attorney, Agent, or Firm* — Nixon & Vanderhye P.C.

(57) ABSTRACT

A communication device according to an example embodiment may include a memory storing a back-off table in which a key value is mapped to each power back-off value and a processor, wherein the processor is configured to transmit the back-off table stored in the memory to an electronic device coupled to the communication device, receive, from the electronic device, a target key value determined based on at least an expected power back-off value required upon the occurrence of a target event, and back off, upon detection of the target event, transmission power of wireless signals transmitted through an antenna of the electronic device, based at least on a power back-off value mapped to the received target key value in the back-off table.

19 Claims, 6 Drawing Sheets

(56) References Cited

U.S. PATENT DOCUMENTS

| | | | |
|---|---|---|---|
| 9,813,997 B2* | 11/2017 | Mercer | H04W 52/245 |
| 10,038,465 B2* | 7/2018 | Park | H04W 52/34 |
| 10,776,880 B2* | 9/2020 | Dalal | G06N 3/045 |
| 11,191,034 B2* | 11/2021 | Cha | H04W 52/245 |
| 11,490,338 B1* | 11/2022 | Khawand | H04B 17/318 |
| 11,871,294 B2* | 1/2024 | Lu | H04W 36/0069 |
| 11,888,508 B2* | 1/2024 | Yun | H04B 1/40 |
| 11,916,793 B2* | 2/2024 | Backes | H04W 52/287 |
| 11,963,112 B2* | 4/2024 | Cho | H04B 1/401 |
| 2009/0305742 A1 | 12/2009 | Caballero et al. | |
| 2012/0021707 A1* | 1/2012 | Forrester | H04W 52/30 455/115.3 |
| 2012/0231784 A1* | 9/2012 | Kazmi | H04W 36/0072 455/423 |
| 2016/0366015 A1 | 12/2016 | Prendergast et al. | |
| 2021/0051599 A1* | 2/2021 | Cha | H04W 52/367 |
| 2021/0377881 A1* | 12/2021 | Cho | H03F 1/56 |
| 2022/0256519 A1* | 8/2022 | Jeon | G01S 7/0235 |
| 2022/0360975 A1* | 11/2022 | Oh | H04W 60/04 |
| 2022/0377799 A1* | 11/2022 | MolavianJazi | H04W 52/42 |
| 2022/0385381 A1* | 12/2022 | MolavianJazi | H04W 52/48 |
| 2023/0083550 A1* | 3/2023 | Sambhwani | G01S 7/003 342/146 |
| 2024/0106480 A1* | 3/2024 | Nadakuduti | H04W 52/44 |
| 2024/0373371 A1* | 11/2024 | Gao | H04W 52/146 |
| 2024/0388335 A1* | 11/2024 | Li | H04B 7/0854 |
| 2024/0389033 A1* | 11/2024 | Bai | H04L 1/0009 |

FOREIGN PATENT DOCUMENTS

| | | |
|---|---|---|
| KR | 10-2018-0028801 | 3/2018 |
| KR | 10-2020-0048228 A | 5/2020 |
| KR | 10-2194839 | 12/2020 |
| KR | 10-2021-0019814 A | 2/2021 |
| KR | 10-2021-0027898 | 3/2021 |

* cited by examiner

| Target event \ Frequency band | LTE Band 1 | LTE Band 2 | LTE Band 3 | ... | LTE Band 66 |
|---|---|---|---|---|---|
| Event related to operation of grip sensor | Key 7 | Key 6 | Key 8 | ... | Key 4 |

| Target event \ Frequency band | LTE Band 1 | LTE Band 2 | LTE Band 3 | ... | LTE Band 66 |
|---|---|---|---|---|---|
| Event related to operation of grip sensor | Key 6 | Key 6 | Key 9 | ... | Key 4 |

FIG. 6

METHOD AND DEVICE FOR BACKING OFF COMMUNICATION POWER

CROSS-REFERENCE TO RELATED APPLICATIONS

This application is a continuation of International Application No. PCT/KR2022/013241, designating the United States, filed on Sep. 5, 2022, in the Korean Intellectual Property Receiving Office, claiming priority from Korean Patent Application No. 10-2021-0125576, filed on Sep. 23, 2021, the disclosures of which are hereby incorporated herein by reference for all purposes as if fully set forth herein.

BACKGROUND

1. Field

The disclosure relates to a method and/or device for controlling communication power, and/or to a method and/or device for controlling communication power capable of reducing a human specific absorption rate due to wireless signals generated from electronic device(s).

2. Description of Related Art

Growth in the use of electronic devices increases interest in the effect of electromagnetic waves generated from electronic devices on the human body. A specific absorption rate (SAR) refers to the amount of energy that the human body absorbs from electromagnetic waves generated from electronic devices. In general, a user uses an electronic device in proximity to a part of their body. Since electromagnetic waves generated from electronic devices may affect the user's health, each country defines the allowable amount of electromagnetic waves generated from electronic devices with the SAR standard.

A produced device having an antenna, such as a portable electronic device or a tablet, is required to satisfy the SAR standard designated by country. Therefore, during development, the device is subject to SAR compliance tests, such as FCC, RE-D, etc., to meet the standard of the country where the product is released. Among the tests, the SAR acceptance test aims at identifying the harm of electromagnetic waves to the human body. When an electronic device remains in its maximum or high wireless communication power, the electronic device may substantially exceed the SAR standard. In this case, the wireless communication power of the electronic device may be backed off, using a communication device to satisfy the SAR standard.

SUMMARY

When a communication device without an antenna is coupled with an electronic device having an antenna, the communication device may adjust the transmission power of wireless signals transmitted through the antenna of the electronic device. The communication device may adjust the transmission power of a wireless signal to satisfy the specific absorption rate (SAR) standard. The communication device may be delivered without an antenna to an electronic device manufacturer after being developed, verified, approved, and mass-produced. Therefore, the communication device may not be independently tested for the SAR-related standard but be tested after an electronic device manufacturer installs the communication device in the electronic device. During the SAR-related standard test, the transmission power of wireless signals transmitted through the antenna of the electronic device is required to back off, or data on a power back-off value stored in the communication device needs to be modified since a required power back-off value varies depending on a specification, a type, or a manufacturer of an electronic device. Unfortunately, the manufacturer of an electronic device may not modify the data on a power back-off value in the communication device but request the manufacturer of the communication device to modify the power back-off value in the non-volatile (NV) data of the communication device. Furthermore, when the NV data, in which the power back-off value for the communication device is stored, is modified, a side effect may occur in other parts of the communication device or re-approval may be required.

According to various example embodiments disclosed herein, a communication device according to an example embodiment may back off transmission power of wireless signals transmitted through an antenna of an electronic device, based on at least a pre-stored back-off table. Therefore, the communication device may lower the transmission power of wireless signals to a level equal to or less than threshold power satisfying the specific absorption rate (SAR) standard corresponding to a target event, without necessarily separately managing the power value to back off by specification, type, and/or manufacturer of the electronic device.

A communication device according to an example embodiment may include a memory storing a back-off table in which a key value is mapped to each power back-off value and a processor, wherein the processor transmits the back-off table stored in the memory to an electronic device coupled to the communication device, receives, from the electronic device, a target key value determined based on an expected power back-off value required upon the occurrence of a target event, and back off transmission power of wireless signals transmitted through an antenna of the electronic device, based on power back-off value mapped to at least the received target key value in the backoff table when the occurrence of the target event is detected.

A method performed by a communication device, according to an example embodiment, may include storing a back-off table in which a key value is mapped to each power back-off value, transmitting the back-off table to an electronic device coupled to the communication device, receiving, from the electronic device, a target key value determined based on an expected power back-off value required upon the occurrence of a target event, and backing off transmission power of wireless signals transmitted through an antenna of the electronic device, based on power back-off value mapped to at least the received target key value in the backoff table when the occurrence of the target event is detected.

An electronic device according to an example embodiment may include a processor which receives a back-off table in which a key value is mapped to each power back-off value, calculates an expected power back-off value required upon the occurrence of a target event, calculates a target key value corresponding to the target event in the received back-off table, based on at least the calculated expected power back-off value, and transmits the target key value to the communication device in order for the communication device to back off transmission power of wireless signals transmitted through an antenna of the electronic device, with the target key value and the mapped power back-off value.

BRIEF DESCRIPTION OF THE DRAWINGS

Certain example embodiments are illustrated in the accompanying drawings, throughout which like reference letters indicate corresponding parts in the various figures. The embodiments herein will be better understood from the following description with reference to the drawings, in which:

FIG. 6 is an example diagram of a table in which a target key value is mapped to each frequency band accessible by an electronic device according to an example embodiment.

DETAILED DESCRIPTION

Figure 1:
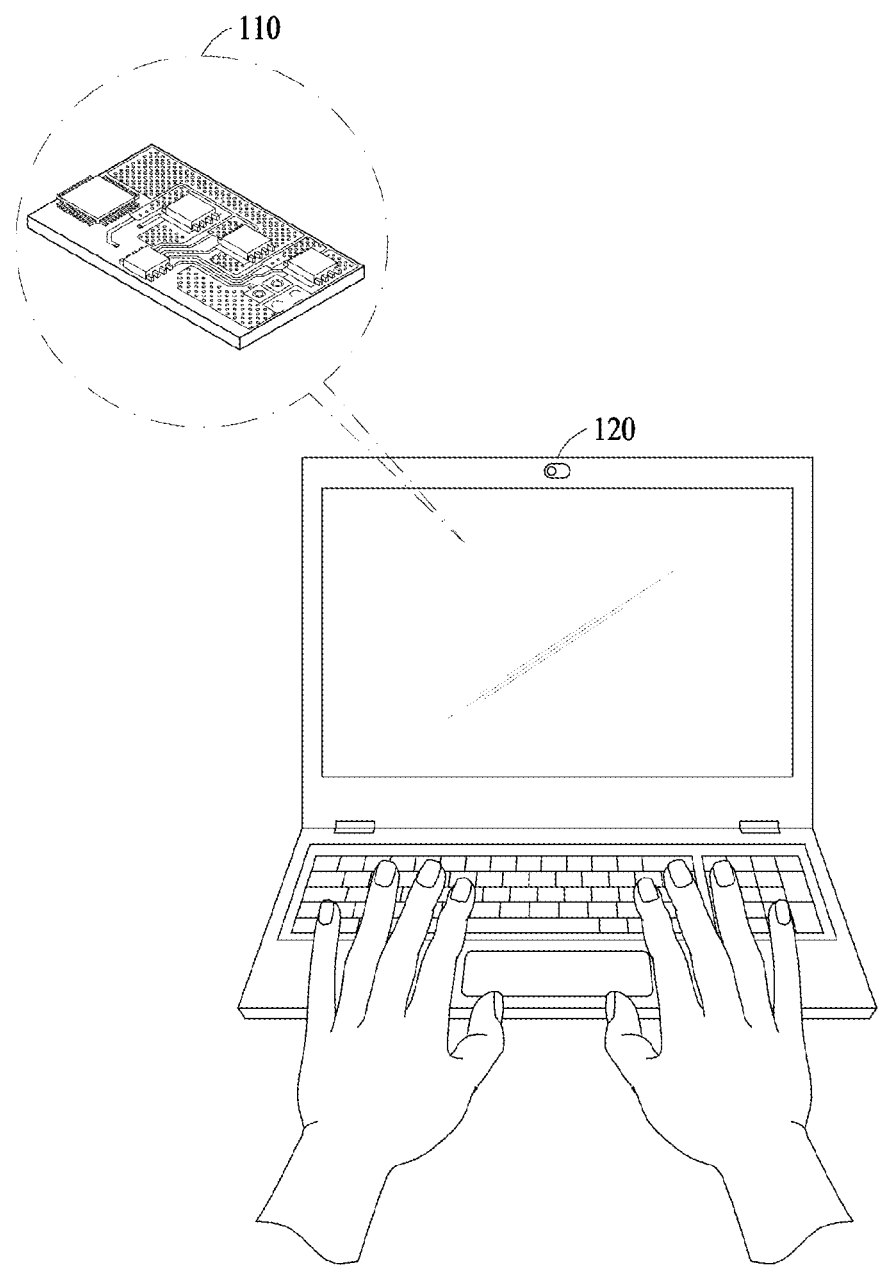
FIG. 1 is a diagram illustrating a process in which a communication device couples to an electronic device to control communication power of wireless signals, according to an example embodiment.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, examples will be described in detail with reference to the accompanying drawings. When describing the example embodiments with reference to the accompanying drawings, like reference numerals refer to like constituent elements and a repeated description related thereto will be omitted.

FIG. 1 is a diagram illustrating a process in which a communication device couples to an electronic device to control communication power of wireless signals, according to an example embodiment.

A communication device 110 according to an example embodiment may be coupled to an electronic device 120. According to an example embodiment, the communication device 110 may not include an antenna, but the electronic device 120 may include one. The communication device 110 may be coupled to the electronic device 120 having an antenna device to support the electronic device 120 in wireless communication.

The communication device 110 may use the antenna of the electronic device 120 as an emitter to support a communication function including data communication of the electronic device 120. In an example embodiment, the communication device 110 may be coupled to the electronic device 120 through a slot inside the electronic device 120 without a communication function. The communication device 110 may, for example, couple to an antenna of the electronic device 120 through a radio frequency (RF) port in the electronic device 120 and may transmit wireless signals through the antenna of the electronic device 120 to support the electronic device 120 in data communication such as 3G/LTE/5G.

For example, the communication device 110 may be an RF communication module, including communication circuitry, capable of transmitting and receiving an RF signal. As another example, the electronic device 120 may be a note personal computer (PC) that does not support at least some communication functions. However, the electronic device 120 and the communication device 110 are not necessarily limited thereto.

According to an example embodiment, the communication device 110 may control the communication power of wireless signals transmitted through the antenna of the electronic device 120 (hereinafter, "transmission power") after coupling to the electronic device 120. For example, the communication device 110 may back off the transmission power of wireless signals transmitted through the antenna of the electronic device 120 to satisfy the specific absorption rate (SAR) standard.

According to an example embodiment, the communication device 110 may detect the occurrence of an event after coupling to the electronic device 120. In this case, the event may be or include an event for limiting the transmission power of wireless signals transmitted through the antenna to a predetermined level or less. For example, the event may include an event related to the operation of a grip sensor, an event related to the insertion of earphones, or an event related to the operation of a mobile hotspot. In an example embodiment, the SAR standard may be determined differently by type of the event. When detecting a target event, the communication device 110 may back off the transmission power of wireless signals transmitted through the antenna of the electronic device 120.

For example, the communication device 110 detects an event related to the operation of a grip sensor. In an example embodiment, the electronic device 120 may include the grip sensor. The grip sensor may detect human contact through a sensing node. For example, at least a part of the grip sensor may be disposed outside the electronic device 120. The grip sensor is a component that detects whether a user touches the electronic device 120. The grip sensor may, for example, detect whether human contact occurs by detecting the amount of change in capacitance. A user may contact the sensing node formed in a predetermined area outside the electronic device 120. For example, as shown in FIG. 1, the user may type on the electronic device 120, in which case the user's hand may contact the sensing node formed in a predetermined area outside the electronic device 120. As another example, the user may put the electronic device 120 on their lap, in which case the user's knee may contact the sensing node formed in a predetermined area outside the electronic device 120. In an example embodiment, when the user contacts with the sensing node formed in a predetermined area outside the electronic device 120, the communication device 110 may reduce transmission power of wireless signals transmitted by the electronic device 120 to a predetermined level or less. For example, the communication device 110 may back off the transmission power of wireless signals when an event related to the operation of a grip sensor occurs. For example, when the transmission power of wireless signals transmitted through the antenna of the electronic device 120 is about 24 dBm and the wireless communication power needs to be kept at about 17 dBm or less to satisfy the SAR standard corresponding to the event related to the operation of a grip sensor, the communication device 110 may back off the transmission power of wireless signals at a power back-off value of about 7 dB or more to satisfy the SAR standard corresponding to the event related to the operation of a grip sensor.

Figure 2:
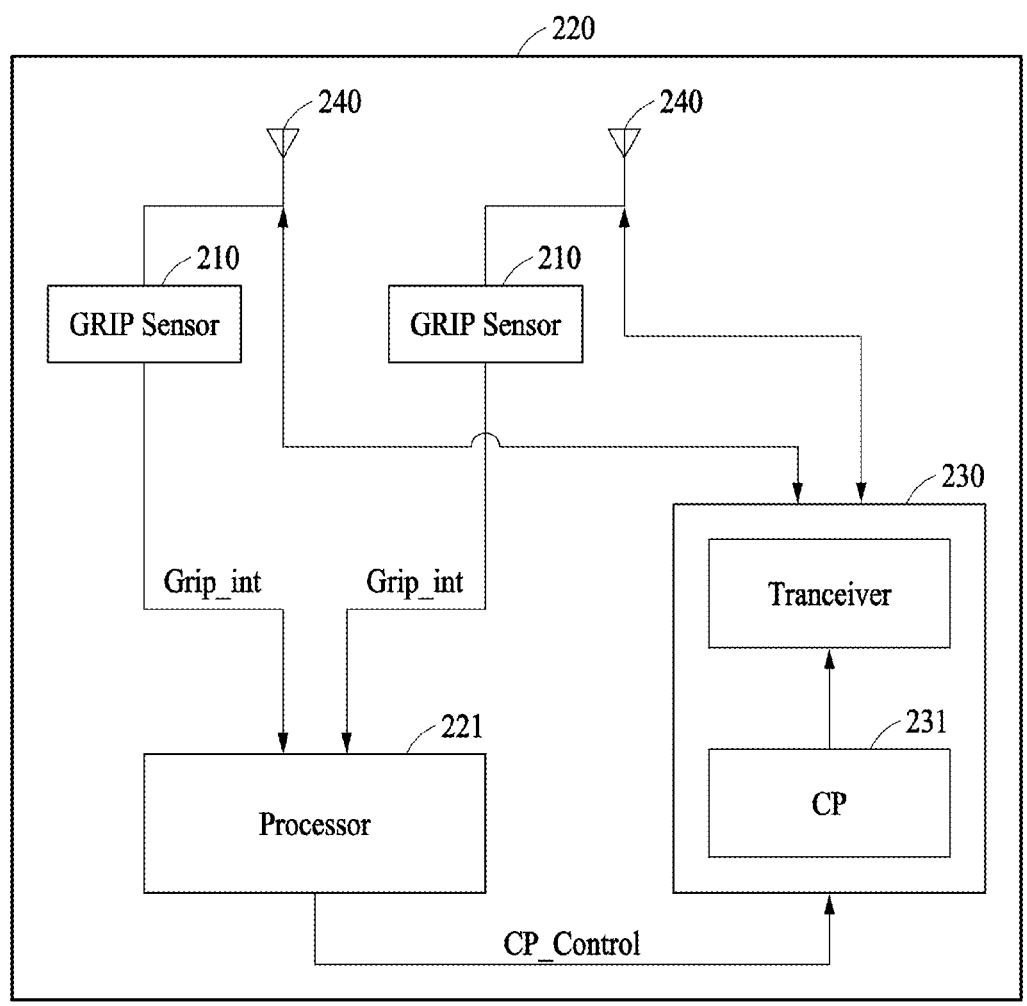
FIG. 2 is a diagram illustrating a process in which a communication device according to a comparative embodiment backs off transmission power of wireless signals.

FIG. 2 is a diagram illustrating a process in which a communication device according to a comparative embodiment backs off transmission power of wireless signals.

Hereinafter, mainly described is a case where a target event detected by a communication device is an event related to the operation of a grip sensor 210. However, the target event is not necessarily limited thereto, and the communication device may detect the occurrence of events other than the event.

In a comparative embodiment, an electronic device 220 may include a grip sensor 210, an antenna 240, and a processor 221 including processing circuitry. The grip sensor 210 may generate an interrupt signal when detecting human contact through a sensing node. The interrupt signal generated by the grip sensor 210 may be transmitted to the processor 221. The processor 221 may detect the occurrence of an event related to the operation of the grip sensor 210 by the interrupt signal received from the grip sensor 210.

Thereafter, the at least one processor 221 may transmit, via at least one antenna 240 and/or communication circuitry, a power control command to a communication device 230 (including communication circuitry) coupled to the electronic device 220 to satisfy the SAR standard. For example, the processor 221 may transmit the occurrence of an event related to the grip sensor 210 to a central or communication processor (CP) 231 of the communication device 230 and transmit a power control command upon the occurrence of the event. For example, the interrupt signal generated by the grip sensor 210 may be transmitted to the processor 221 and the communication device 230 may receive the occurrence of the event from the processor 221.

The communication device 230, including communication circuitry, may back off transmission power of wireless signals transmitted through the antenna 240 of the electronic device 220, based on a preset candidate power value, in response to the occurrence of the event related to the operation of the grip sensor 210. For example, the communication device 230 may lower the transmission power by a candidate power value preset, in response to the occurrence of the target event, to transmit the wireless signals through the antenna 240.

In this case, the preset candidate power value may be individually determined depending on a type and a manufacturer of the electronic device 220. This is because the power of wireless signals transmitted by the electronic device 220 and a threshold power satisfying the SAR standard vary depending on a type and a manufacturer of the electronic device 220. Accordingly, the candidate power value preset by the communication device 230, in response to the target event, may be set differently depending on a type and a manufacturer of the electronic device 220.

Hereinafter, described in more detail is the operation where the communication device according to a comparative embodiment backs off the transmission power of wireless signals transmitted through the antenna(s) 240 of the electronic device 220.

In a comparative embodiment, when the communication device 230 couples to the electronic device 220, an SAR acceptance test may be performed. The SAR acceptance test may be a test on the electronic device 220 to calculate a power value that satisfies the SAR standard corresponding to a target event. The event related to the operation of the grip sensor 210 may occur by the SAR acceptance test, and the communication device 230 may back off the transmission power of wireless signals transmitted through the antenna(s) 240 of the electronic device 220 to a level equal to or less than a threshold power satisfying the SAR standard corresponding to the event.

When the event related to the operation of the grip sensor 210 occurs and the transmission power exceeds the threshold power aimed at satisfying the SAR standard, the processor 221 of the electronic device 220 provides a power control command to the communication device 230 to lower the transmission power of wireless signals transmitted through the antenna(s) 240/540 of the electronic device 220.

The processor 221 of the electronic device 220 according to a comparative embodiment may control the transmission power of wireless signals transmitted through the antenna 240 of the electronic device 220. The processor 221 may calculate a transmission power value that satisfies the SAR standard while lowering the transmission power of wireless signals output through the antenna 240. The processor 221 may transmit the calculated transmission power value to the communication device 230. The communication device 230 may determine a candidate power value corresponding to the event related to the operation of the grip sensor 210, based on the transmission power value received from the processor 221. The communication device 230 may reflect the determined candidate power value in NV data of the communication device 230 and store the determined candidate power value. The communication device 230 may use the stored candidate power value to verify whether the communication function of the electronic device 220 smoothly operates. For example, after pre-setting a candidate power value corresponding to the event related to the operation of the grip sensor 210, the communication device 230 may, upon detection of the target event, lower the current transmission power of the electronic device 220 to the preset candidate power value to verify whether the SAR standard is met. In case of successful verification, the communication device 230 may provide a download option through FOTA or USB connection to reflect a target power value corresponding in the event related to the operation of the grip sensor 210 to other communication devices under mass production. In this case, the other communication devices may indicate communication devices to couple to an electronic device of the same type and the same manufacturer as those of the electronic device 220.

However, according to a comparative embodiment, an issue may arise when the specifications of the electronic device 220 change. For example, when the specifications of the electronic device 220 change, candidate power to back off needs to change in accordance with the changed specifications of the electronic device 220, which in turns leads to an issue that the power value pre-stored in the communication device 230 requires to be updated. For example, when the candidate power, corresponding to the event related to the sensor operation reflected in the NV data in the communication device 230, changes after the communication device 230 is completely manufactured, this may cause side effects on other parts of the communication device 230. In a comparative embodiment, the power value to back off changes when the communication device 230 is coupled to another electronic device different from the electronic device 220 and also in the case of changed specifications of the electronic device 220. This will result in an issue that the pre-stored candidate power values corresponding to existing events need to be updated in accordance with the other coupled electronic device.

Figure 3:
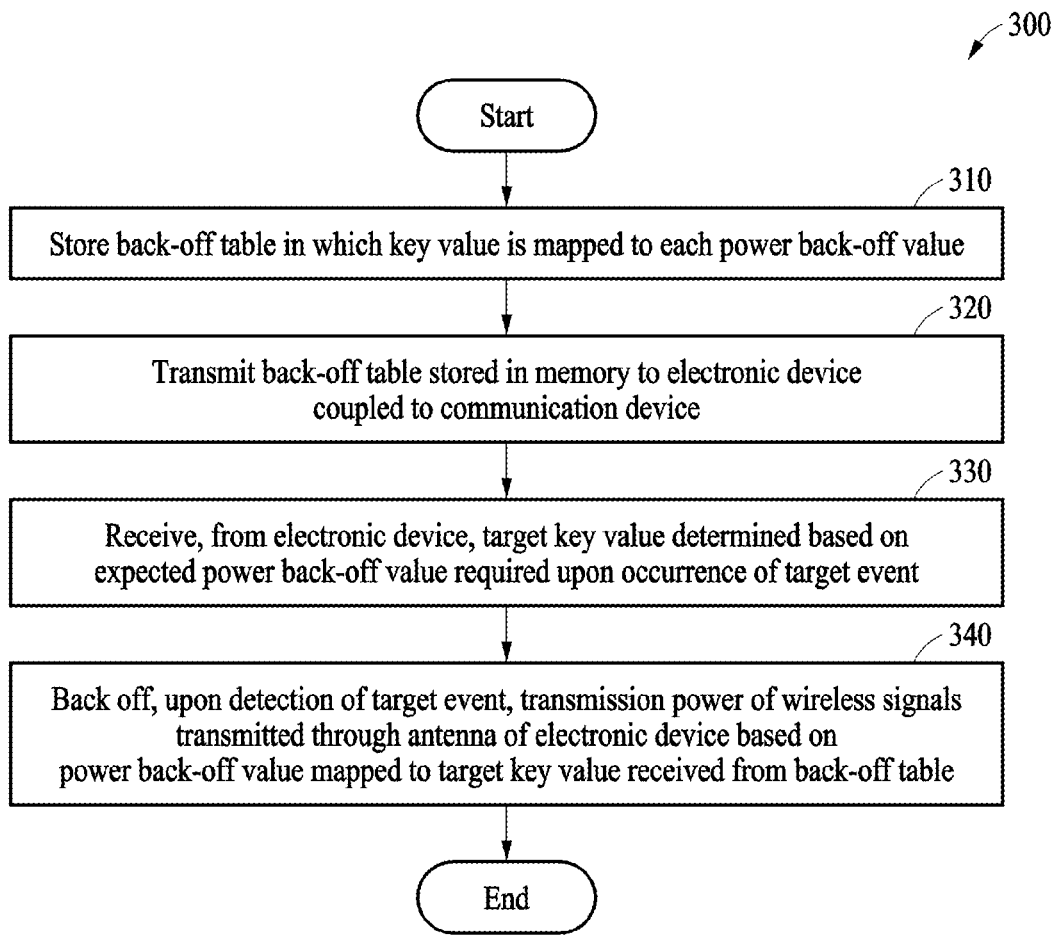
FIG. 3 is a flowchart illustrating a process in which a communication device backs off transmission power of wireless signals according to an example embodiment.

FIG. 3 is a flowchart illustrating a process in which a communication device backs off transmission power of wireless signals according to an example embodiment.

According to an example embodiment, a communication device may store a back-off table in which a key value is mapped to each power back-off value in operation 310. According to an example embodiment, the communication device (e.g., the communication device 110 in FIG. 1) may back off the transmission power of wireless signals transmitted through an antenna of the electronic device with reference to a back-off table stored in a memory. The back-off table is set for a back-off operation to be performed in response to a target event when the communication device detects the occurrence of the target event. Table 1 below shows an example of the back-off table.

TABLE 1

| Key value | Transmission Power Back-off Value |
|---|---|
| Key 1 | 1 dB Power Back-Off |
| Key 2 | 2 dB Power Back-Off |
| Key 3 | 3 dB Power Back-Off |
| Key 4 | 4 dB Power Back-Off |
| Key 5 | 5 dB Power Back-Off |
| Key 6 | 6 dB Power Back-Off |
| Key 7 | 7 dB Power Back-Off |
| Key 8 | 8 dB Power Back-Off |
| Key 9 | 9 dB Power Back-Off |
| Key 10 | 10 dB Power Back-Off |

Referring to Table 1, a power back-off value to be performed by the communication device (e.g., communication device 110 or 530) is mapped to each key value. For example, 'Key 1' may be mapped to the power back-off value of 1 dB, and 'Key 2' may be mapped to the power back-off value of 2 dB. Although the back-off table of Table 1 provides an example including 10 key values and 10 power back-off values respectively mapped to the key values, the number of key values and the number of power back-off values in the back-off table is not limited to 10.

According to an example embodiment, the back-off table may be stored by type of target event detectable by the communication device. The communication device may store the back-off table by event, for example, an event related to the operation of a grip sensor, an event related to the insertion of earphones, or an event related to the operation of a mobile hotspot. In this case, the communication device may use the back-off table corresponding to the type of a detected event to back off the transmission power of wireless signals.

According to another embodiment, the communication device may store only one back-off table regardless of types of target event. In this case, the communication device may back off the transmission power of wireless signals, using one stored back-off table regardless of the type of detected event.

According to an example embodiment, power back-off values mapped to key values adjacent to each other in the back-off table may have a predetermined back-off value difference. The difference in the predetermined back-off values may, for example, be about 1 dB, but is not limited thereto.

The predetermined back-off values may be determined based on the type of target event. For example, the predetermined back-off value in the back-off table corresponding to an event related to the operation of a grip sensor may be determined to be 1 dB. When wireless signals are transmitted through the antenna(s) of an electronic device (e.g., the electronic device 120 in FIG. 1), an expected power back-off value required for the electronic device may vary depending on an event that occurs. In this case, the expected power back-off value may represent a power back-off value to be subtracted from the current transmission power of a wireless signal transmitted through the antenna according to the occurrence of an event.

According to an example embodiment, upon the occurrence of a target event, the expected power back-off value required for the electronic device may vary depending on the type of the electronic device, but the expected power back-off value required for the electronic device when the same type of target event occurs may fall within a certain range regardless of the type of the electronic device. For example, when the electronic device transmits wireless signals using a low frequency band upon the occurrence of an event related to the operation of a grip sensor, a required power back-off value may be between 3 dB and 5 dB, and when the electronic device transmits wireless signals using a high frequency band, a required power back-off value may be between 6 dB and 8 dB. For example, regardless of the type of the electronic device, the range of the expected power back-off value required upon the occurrence of the event related to the operation of a grip sensor is 3 dB to 8 dB. Therefore, a predetermined back-off value (e.g., 1 dB) may be set, considering the range of the expected power back-off value.

According to an example embodiment, the communication device may transmit the back-off table stored in the memory to the electronic device coupled to the communication device in operation 320. The communication device according to an example embodiment may transmit the back-off table stored in the communication device to the electronic device after coupling to the electronic device.

According to an example embodiment, the communication device may receive, from the electronic device, a target key value determined based on an expected power back-off value required upon the occurrence of a target event in operation 330.

According to an example embodiment, the expected power back-off value may represent the value obtained by subtracting, from the current transmission power of the electronic device, a threshold power aimed at satisfying the SAR standard corresponding to the target event.

In order to satisfy the SAR standard, the transmission power of the electronic device may not exceed a certain value. Hereinafter, a maximum or high transmission power of the electronic device, which may satisfy the SAR standard, may be set as a threshold power. The SAR standard may vary depending on the type of electronic device and the type of event. For example, it is assumed that the current transmission power of the electronic device is 24 dBm and the threshold power is set at 22 dBm to satisfy the SAR standard corresponding to the occurrence of an event related to the operation of a grip sensor in the electronic device. In this case, the expected power back-off value may represent 2 dB by subtracting, from the current transmission power of 24 dBm of the electronic device, the threshold power of 22 dBm to satisfy the SAR standard corresponding to the occurrence of an event related to human contact.

According to an example embodiment, the electronic device (e.g., 120 or 520) may calculate a target key value based on an expected power back-off value. The electronic device may calculate a minimum or low power back-off value that is equal to or greater than the expected power back-off value as a target power back-off value among power back-off values mapped to a plurality of key values in the back-off table. In an example embodiment, the electronic device may determine a key value mapped to the target power back-off value in the back-off table to be a target key value. For example, when the expected power back-off value required upon the occurrence of the target event is 2 dB, the electronic device may calculate, as the target power back-off value, the minimum or low power back-off value (2 dB) that is equal to or greater than the expected power back-off value (2 dB) among the power back-off values in the back-off table (e.g., the back off table in Table 1). The electronic device may calculate 'Key 2', a key value mapped to the target power back-off value (2 dB), as a target key value in the back-off table.

According to an example embodiment, the electronic device may calculate the target key value through the SAR acceptance test. According to an example embodiment, the SAR acceptance test may be performed after the communication device and the electronic device couple to each other. The SAR acceptance test may be a test for determining a reduction in the transmission power of wireless signals of the electronic device, in response to the occurrence of the target event. For example, through the SAR acceptance test, the electronic device may calculate the target key value. In this regard, more detailed description is given with reference to FIG. 4.

Each embodiment herein may be used in combination with any other embodiment(s) herein.

According to an example embodiment, when detecting the occurrence of the target event in operation 340, the communication device may back off the transmission power of wireless signals transmitted through the antenna of the electronic device, based on the target key value received from the back-off table and the mapped power back-off value.

According to an example embodiment, the communication device may couple to the electronic device. According to an example embodiment, the communication device may detect the occurrence of a target event. According to another embodiment, a processor of the electronic device may detect the occurrence of a target event and may transmit the occurrence of the target event to the communication device. When detecting the occurrence of the target event, the communication device may extract, from the back-off table, a target key value received from the electronic device and a target power back-off value mapped to the target key value and may back off the transmission power of wireless signals transmitted through the antenna of the electronic device, based on the extracted target power back-off value.

Figure 4:
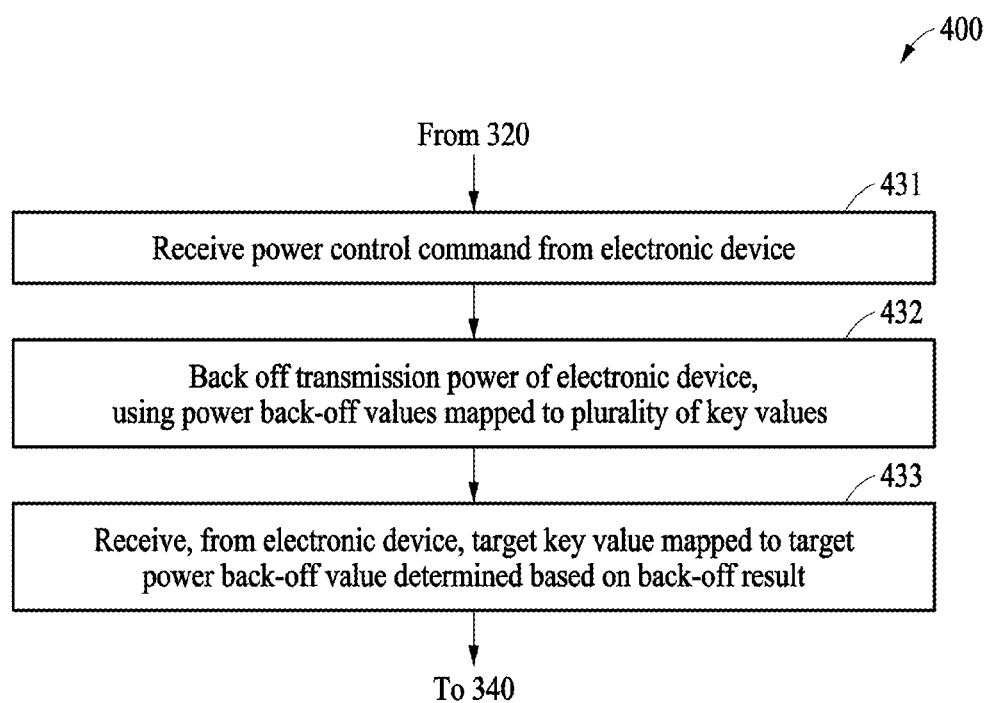
FIG. 4 is a flowchart illustrating a process in which a communication device according to an example embodiment backs off transmission power of wireless signals to calculate a target power back-off value that satisfies the SAR standard.

FIG. 4 is a flowchart illustrating a process 400 in which a communication device according to an example embodiment backs off transmission power of wireless signals to calculate a target power back-off value that satisfies the SAR standard.

In operation 431, a communication device (e.g., the communication device 110 in FIG. 1) may receive, from an electronic device (e.g., the electronic device 120 in FIG. 1), a control command for the transmission power of the electronic device.

After the communication device and the electronic device couple to each other, the SAR acceptance test may be performed. For example, a target event may be intentionally generated by the electronic device to induce the communication device to automatically back off the transmission power of the electronic device and the electronic device may calculate a target power back-off value to back off.

The electronic device may identify the transmission power of wireless signals transmitted through the antenna. Upon detection of the occurrence of the target event, the electronic device may determine whether the transmission power of wireless signals exceeds a threshold power aimed at satisfying the SAR standard corresponding to the target event.

According to an example embodiment, when the transmission power identified by the electronic device exceeds the threshold power, the communication device may receive a power control command, from the electronic device, to back off the transmission power, using power back-off values mapped to a plurality of key values (e.g., see step 432 in FIG. 4). For example, when the transmission power of a wireless signal transmitted through the antenna exceeds the threshold power corresponding to the target event, the electronic device may transmit a command for controlling the transmission power to the communication device. Upon receipt of the command for controlling the transmission power of the electronic device from the electronic device, the communication device may control the transmission power of the electronic device, based on the stored back-off table.

According to an example embodiment, the communication device may back off the transmission power of the electronic device, using the power back-off values mapped to the plurality of key values.

When receiving, from the electronic device, a control command for the transmission power, the communication device according to an example embodiment may back off the current transmission power of the electronic device, using the power back-off values mapped to the plurality of key values in the back-off table (e.g., see step 432 in FIG. 4).

According to an example embodiment, the communication device backs off the transmission power of the electronic device, based on one of the power back-off values mapped to the plurality of key values. When the backed-off transmission power keeps exceeding the threshold power, the communication device may further back off the transmission power, based on another power back-off value that is greater than the one power back-off value. For example, the communication device may back off the transmission power of the electronic device from the maximum or high transmission power of the electronic device, using the power back-off values mapped to the plurality of key values in the back-off table.

For example, the communication device may successively subtract the transmission power of the electronic device, based on the power back-off values mapped to the plurality of key values in the back-off table. For example, it is assumed that the back-off table of Table 1 is stored in the communication device. Upon receipt, from the electronic device, of a control command for the transmission power, the communication device may back off the transmission power by the power back-off value of 1 dB based on the minimum value of 1 dB among the power back-off values in the back-off table. The electronic device may identify the updated transmission power of wireless signals. When the updated transmission power keeps exceeding the threshold power aimed at satisfying the SAR standard, the electronic device may transmit the command for controlling the transmission power of the wireless signals back to the communication device. Then, the communication device may back off the transmission power of wireless signals transmitted through the antenna of the electronic device based on a second minimum power back-off value of 2 dB among the power back-off values in the back-off table. For example, the communication device may further back off the transmission power by 1 dB from the updated transmission power of the electronic device. In a similar manner, the communication device may back off the transmission power of wireless signals transmitted through the antenna of the electronic device until the transmission power of the electronic device is lowered to a level less than or equal to the threshold power corresponding to the target event. For example, the communication device may update the transmission power by subtracting a power back-off value from the current transmission power in the order of the minimum or low value to the maximum or high value among the power back-off values mapped to the plurality of key values. By continuously identifying the updated transmission power of wireless signals transmitted through the antenna of the electronic device, the electronic device may continuously determine whether the updated transmission power is equal to or less than the threshold power aimed at satisfying the SAR standard corresponding to the target event.

According to an example embodiment, the communication device may receive a target key value mapped to the target power back-off value determined based on the back-off result from the electronic device in operation 433.

According to an example embodiment, the communication device may receive, as a target key value, a minimum power back-off value for backing off the transmission power of wireless signals transmitted through the antenna of the electronic device at a level equal to or less than the threshold power among the power back-off values mapped to the plurality of key values.

According to an example embodiment, the electronic device calculates, as a target power back-off value, a first power back-off value at which the transmission power of the wireless signals reaches the threshold power or below by identifying the transmission power of the wireless signals transmitted through the antenna. For example, the target power back-off value may be a minimum power back-off value capable of backing-off transmission power of wireless signals transmitted through the antenna of the electronic device to a threshold power or below among the power back-off values mapped to the plurality of key values.

According to an example embodiment, the electronic device may determine a key value mapped to a target power back-off value in the back-off table to be a target key value. For example, the electronic device may transmit the determined target key value to the communication device, which may then store the target key value received from the electronic device corresponding to a target event. Thereafter, when detecting the occurrence of the target event, the communication device may extract the target key value stored to correspond to the target event and back off the transmission power of wireless signals with the target back-off power value mapped to the target key value in the back-off table. The communication device may automatically back off the transmission power of wireless signals with the target back-off power value mapped to the target key value without a power control command from the processor of the electronic device.

Figure 5:
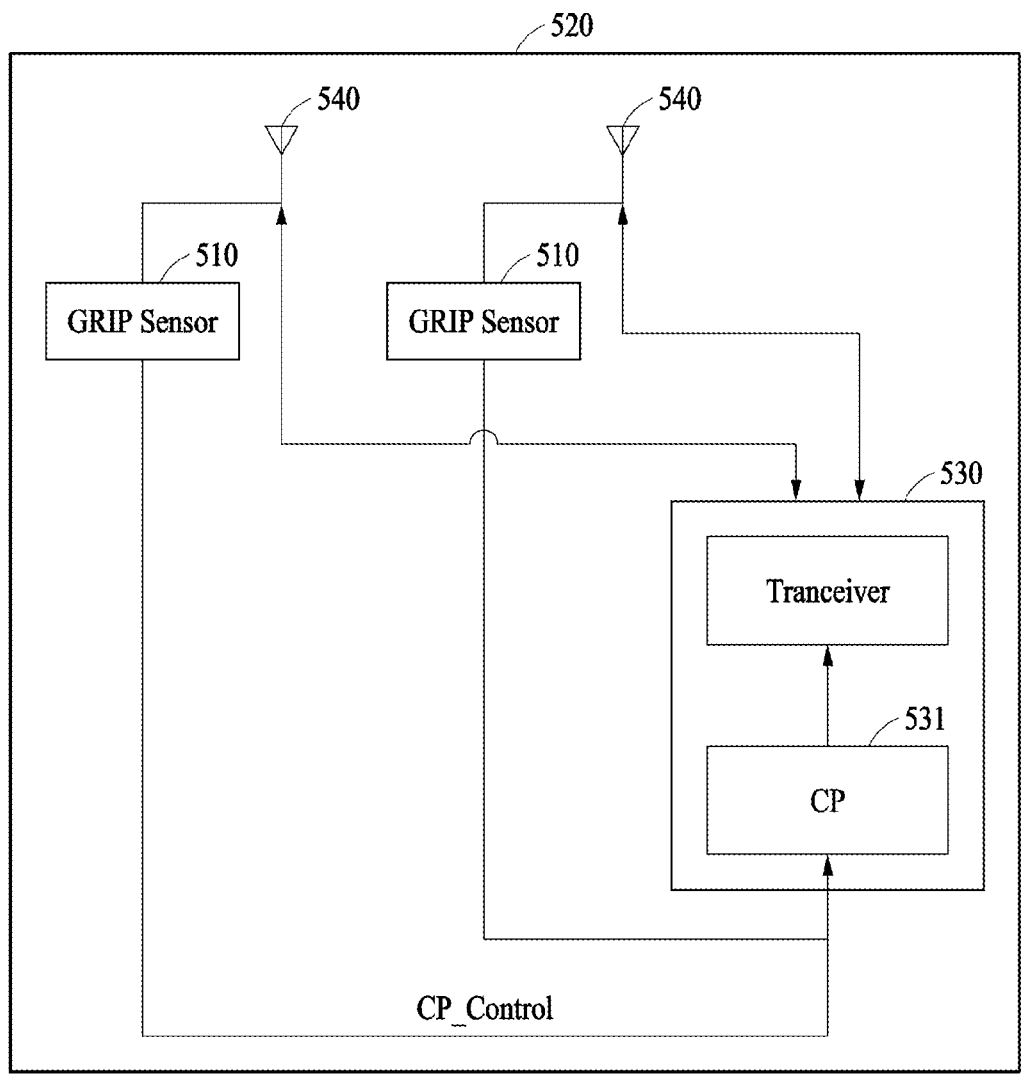
FIG. 5 is a diagram illustrating a process in which a communication device backs off transmission power of wireless signals according to an example embodiment.

FIG. 5 is a diagram illustrating a process in which a communication device backs off transmission power of wireless signals according to an example embodiment.

Hereinafter, mainly described is a target event detected by a communication device in relation to the operation of a grip sensor. However, the target event is not necessarily limited thereto, and the communication device may detect events other than the event related to the operation of a grip sensor.

According to an example embodiment, an electronic device 520 may include a grip sensor 510, an antenna 540, and a processor including processing circuitry (not shown). As described with reference to FIG. 2, the grip sensor 510 may generate an interrupt signal when detecting human contact through a sensing node. According to an example embodiment, the interrupt signal generated by the grip sensor 510 may be directly transmitted to a communication and/or central processor (CP) 531 of a communication device 530. When receiving the interrupt signal from the grip sensor 510 via the transceiver (which includes communication circuitry), the communication device 530, including communication circuitry, may determine that an event related to the operation of the grip sensor 510 has occurred. According to another embodiment, the interrupt signal generated by the grip sensor 510 may be transmitted to the processor of the electronic device 520. Upon receipt of the interrupt signal, the processor of the electronic device 520 may determine whether the event related to the operation of the grip sensor 510 has occurred and transmit the occurrence of the event related to the operation of the grip sensor 510 to the communication processor 531 of the communication device 530. In this case, the communication device 530 may determine whether the event related to the operation of the grip sensor 510 occurs through the processor of the electronic device 520.

According to an example embodiment, when not detecting the occurrence of a target event, the communication device 530 may maintain the transmission power of the electronic device. For example, when the interrupt signal is not transmitted by the grip sensor 510, the communication device 530 may maintain the transmission power of wireless signals of the electronic device 520.

Hereinafter, described in more detail is the operation where the communication device 530 according to an example embodiment backs off the transmission power of wireless signals transmitted through the antenna of the electronic device 520.

In an example embodiment, the processor of the electronic device 520 may receive, from the communication device 530, a back-off table in which a key value is mapped to each power back-off value. The processor of the electronic device 520 may calculate an expected power back-off value required upon the occurrence of the target event caused by the SAR acceptance test. For example, the expected power back-off value may be a value obtained by subtracting, from the transmission power, the threshold power aimed at satisfying the SAR standard corresponding to the target event.

In an example embodiment, the SAR acceptance test may be performed after the communication device 530 couples to the electronic device 520. During the SAR acceptance test, the event related to the operation of the grip sensor 510 may be intentionally generated and the communication device 530 may back off the transmission power of wireless signals transmitted through the antenna(s) 540 of the electronic device 520 at a level equal to or less than the threshold power aimed at satisfying the SAR standard corresponding to the event. The communication device 530 may lower the transmission power of wireless signals output through the antenna 540, based on power back-off values mapped to a plurality of key values in the back-off table (e.g., Table 1), and the processor of the electronic device 520 may calculate a target power back-off value that satisfies the SAR standard corresponding to the event. The processor of the electronic device 520 may calculate, as a target power back-off value, a minimum or low power back-off value to back off the transmission power of wireless signals at a level equal to or less than the threshold power aimed at satisfying the SAR standard corresponding to the target event among the power back-off values mapped to the plurality of key values in the back-off table (e.g., Table 1) and may calculate a target power back-off value and a mapped key value as target key values. A process in which the communication device 530 calculates the target power back-off value while lowering the transmission power of wireless signals, based on the plurality of key values and the mapped power back-off values, is the same as described with reference to FIG. 4.

The processor of the electronic device 520 may transmit the target key value in order for the communication device 530 to back off the transmission power of wireless signals transmitted through the antenna of the electronic device 520. The communication device 530 may receive the target key value of an event corresponding to the target key from the processor of the electronic device 520 and store the key value.

According to an example embodiment, the communication device 530 may receive, from the processor of the electronic device 520, the back-off table and the target key corresponding to the event related to the operation of the grip sensor 510. According to an example embodiment, the communication device 530 may itself detect the occurrence of the target event by directly or indirectly receiving the interrupt signal generated by the grip sensor(s) 510. In this case, the communication device 530 may automatically back off the transmission power of wireless signals transmitted through the antenna of the electronic device, using the power back-off value mapped to the target key corresponding to the target event without receiving a power control command signal from the processor of the electronic device 520.

According to another embodiment, the occurrence of the target event may be detected by the processor of the electronic device 520. Upon receipt of the interrupt signal generated by the grip sensor 510, the processor of the electronic device 520 may detect the occurrence of the target event and the processor of the electronic device 520 may transmit the occurrence to the communication device 530. In this case, the communication device 530 may receive the occurrence of the target event only, that is, without the power control command signal from the processor of the electronic device 520. The communication device 530 may back off the transmission power of wireless signals transmitted through the antenna of the electronic device with the power back-off value mapped to the target key corresponding to the target event without receiving the power control command signal from the processor of the electronic device 520. For example, the communication processor 531 (including processing circuitry) of the communication device 530 may back off the transmission power of wireless signals transmitted through the antenna of the electronic device with the power back-off value mapped to the target key.

According to an example embodiment, the communication processor 531 of the communication device 530 may control the transmission power of wireless signals transmitted through the antenna. In a comparative embodiment, the processor of the electronic device (e.g., the processor 221 in FIG. 2) may control the transmission power of wireless signals transmitted through the antenna.

For example, the communication device 530 may receive, from the electronic device 520, key values corresponding to each type of event detectable by the communication device 530 and store the key values. Thereafter, when detecting the occurrence of the target event, the communication device 530 may back off the transmission power of the electronic device 520 with the power back-off value mapped with the key value corresponding to the type of target event.

Thereafter, when detecting the release of the target event, the communication device 530 may change the transmission power of the electronic device 520 back to the transmission power before being backed off. For example, when the interrupt signal received from the grip sensor 510 deactivates, the communication device 530 may determine that the event related to the operation of the grip sensor has stopped and may increase the transmission power of the electronic device, using the power back-off value mapped to the key value to return to the existing transmission power. As another example, the communication device 530 may receive the release of the target event from the processor of the electronic device 520 and may increase the transmission power of the electronic device by the power back-off value mapped to the target key value.

When the target event occurs, the communication device according to a comparative embodiment (e.g., the communication device 230 in FIG. 2) backs off the transmission power value of wireless signals with a preset candidate power value corresponding to the target event. The communication device according to the comparative embodiment is vulnerable to change in specifications of the electronic device since the candidate power value to back off is received from the electronic device and reflected in the NV data in advance. In other words, any change in the specifications of the electronic device requires a change to the power value corresponding to the target event to back off the transmission power of the electronic device, which unfortunately results in a change to the candidate power value corresponding to the target event reflected in the NV data. In addition, where the specifications of the electronic device do not change but the communication device couples to another electronic device even when the same event occurs, the power value to back off the transmission power of the other electronic device should be newly reflected in the NV data. In this case, the NV data of the communication device already manufactured is frequently updated and the update may increase the risk of side effects to other parts of the communication device. Furthermore, change to the NV data in the communication device may require re-approval.

On the other hand, the communication device 530 according to an example embodiment may receive the target key value corresponding to the target event from the electronic device 520 through the SAR acceptance test. When the target event occurs, the communication device 530 may back off the transmission power of the electronic device by the target key value received from the electronic device 520 and the power back-off value mapped in the back-off table. Upon the occurrence of the target event, it is enough for the communication device 530 according to an example embodiment to back off the transmission power of wireless signals, using the back-off table and the target key value received from the electronic device 520. Therefore, the NV data may not be managed separately by specification, type or manufacturer of the electronic device. For example, when the type, specification, or manufacturer of the coupled electronic device 520 changes, the communication device 530 according to an example embodiment may receive a target key value corresponding to a target event to back off the transmission power from the coupled electronic device 520 and may determine a back-off value using the received target key value. Accordingly, the communication device 530 according to an example embodiment may remove the risk of verification and re-approval according to the change of NV data after being manufactured.

Since the NV data is required to be separately managed by specification, type, or manufacturer of the electronic device, the communication device (e.g., the communication device 230 in FIG. 2) in the comparative embodiment receives a power control command from the processor of the electronic device (e.g., the processor 221 in FIG. 2), and the communication processor of the communication device (e.g., the communication processor 231 in FIG. 2) backs off the transmission power under the power control command from the processor of the electronic device.

However, as the electronic device according to an example embodiment may not manage the NV data separately by specification, type, or manufacturer of the electronic device, the communication processor 531 of the communication device itself may back off the transmission power. For example, the communication device according to an example embodiment may itself back off the transmission power of wireless signals transmitted through the antenna of the electronic device upon detection of the occurrence of the event without receiving a power control command signal from the processor of the electronic device.

FIG. 6 is an example diagram of a table in which target key values are mapped by frequency bands accessible by an electronic device according to an example embodiment.

The electronic device (e.g., the electronic device 520 in FIG. 5) according to an example embodiment may determine a target key value corresponding to a target event from a back-off table (e.g., Table 1). As another example, the electronic device according to an example embodiment may individually set a target key value for each frequency band which the electronic device may access for wireless communication with respect to a target event. When the electronic device performs communication in a first frequency band among frequency bands accessible for wireless communication, a communication device (e.g., the communication device 530 in FIG. 5) may receive a first key value set for the first frequency band, and when the electronic device performs communication in a second frequency band, the communication device may receive and store a second key value set for the second frequency band. Thereafter, when detecting the occurrence of a target event, the communication device may back off the transmission power of wireless signals with the frequency band through which the electronic device performs wireless communication and the power back-off value mapped to the key value corresponding to the target event.

Tables 610 and 620 in FIG. 6 may include a target event, a frequency band, and a key value. For example, a key value may be mapped by target event and frequency band. FIG. 6 only illustrates the event related to the operation of a grip sensor (e.g., the grip sensor 510 in FIG. 5) in the table, but the present disclosure is not limited thereto, and the table may also include events other than the event in the table that are mapped by frequency band.

According to an example embodiment, the table 610 may include key values aimed at satisfying the SAR standard corresponding to a target event by frequency band accessible by a first electronic device. The table 620 may include key values aimed at satisfying the SAR standard corresponding to a target event by frequency band accessible by a second electronic device. The second electronic device may be an electronic device having a different specification, type, or manufacturer than the first electronic device.

According to an example embodiment, the SAR acceptance test may be performed after the communication device couples to the first electronic device. The first electronic device may calculate a key value aimed at satisfying the SAR standard for each frequency band accessible to perform wireless communication in the back-off table through the SAR acceptance test. The first electronic device may, for example, generate the table 610 with the key values determined by frequency band. The first electronic device may transmit, to the communication device, a key value mapped to a target event and a specific frequency band in the table 610. When the first electronic device performs communication in a specific frequency band and a target event occurs, the communication device may back off the transmission power of the first electronic device with the back-off power value mapped to the key value, received from the communication device, in the back-off table (e.g., Table 1).

In addition, the SAR acceptance test may be performed after the communication device couples to the second electronic device. The second electronic device may calculate a key value aimed at satisfying the SAR standard for each frequency band accessible to perform wireless communication in the back-off table through the SAR acceptance test. The second electronic device may, for example, generate the table 620 with the key values determined for each frequency band. The second electronic device may transmit, to the communication device, the key value mapped to a target event and a specific frequency band in the table 620. When the second electronic device performs communication in a specific frequency band and a target event occurs, the communication device may back off the transmission power of the first electronic device with the power value mapped to the key value received from the communication device in the back-off table (e.g., Table 1).

Since the power value to back off the transmission power of the electronic device varies depending on a type, specification, or manufacturer of the electronic device, the communication device according to an example embodiment may receive, from the electronic device, a key value corresponding to a target event through the SAR acceptance test after the communication device couples to the electronic device. For example, the communication device may receive a key value corresponding to a target event and a frequency band from the electronic device through the SAR acceptance test.

For example, it is assumed that the communication device couples to the first electronic device and the first electronic device accesses a frequency band of LTE Band 1 to perform wireless communication. The communication device may receive a key value (e.g., 'key 7') set for the frequency band of LTE Band 1 from the first electronic device through the SAR acceptance test. When the event of the operation of a grip sensor occurs upon human contact with a sensing node, the communication device may detect the occurrence of the event upon receipt of an interrupt signal from the grip sensor. The communication device may back off the transmission power of the first electronic device based on the stored back-off table (e.g., Table 1) with a key value (e.g., 'key 7') received from the first electronic device and a mapped power back-off value (e.g., 7 dB). As another example, the communication device may receive a key value (e.g., 'key 8') set for the frequency band of LTE Band 3 from the first electronic device through the SAR acceptance test and may back off the transmission power of the first electronic device with the power back-off value of 8 dB mapped to 'Key 8' when the first electronic device accesses the frequency band of LTE Band 3.

As another example, it is assumed that the communication device couples to the second electronic device and the second electronic device accesses the frequency band of LTE Band 1 to perform wireless communication. The communication device may receive a key value (e.g., 'key 6') set for the frequency band of LTE Band 1 from the second electronic device through the SAR acceptance test. When the event of the operation of a grip sensor occurs upon human contact with the sensing node, the communication device may detect the occurrence of the event upon receipt of the interrupt signal from the grip sensor. The communication device may back off the transmission power of the second electronic device based on the stored back-off table (e.g., Table 1) with a key value (e.g., 'key 6') received from the second electronic device and a mapped power back-off value (e.g., 6 dB).

A communication device (the communication device 530 in FIG. 5) according to an example embodiment may include a memory storing a back-off table (e.g., Table 1) in which a key value is mapped to each power back-off value and a processor, wherein the processor transmits the back-off table stored in the memory to an electronic device coupled to the communication device (e.g., the electronic device 520 in FIG. 5), receives, from the electronic device, a target key value determined based on an expected power back-off value required upon the occurrence of a target event, and back off the transmission power of wireless signals transmitted through the antenna of the electronic device, based on power back-off value mapped to at least the received target key value in the backoff table when the occurrence of the target event is detected.

In the back-off table (e.g., Table 1), power back-off values mapped to the key values adjacent to each other may have a predetermined back-off value difference.

The expected power back-off value may be a value obtained by subtracting a threshold power aimed at satisfying the SAR standard corresponding to the target event from the transmission power.

When the transmission power identified by the electronic device exceeds the threshold power, the processor (e.g., the communication processor 531 in FIG. 5) may back off the transmission power, using power back-off values mapped to a plurality of key values.

The processor (e.g., the communication processor 531 in FIG. 5) may back off the transmission power based on one of the power back-off values mapped to the plurality of key values and may further back off the transmission power based on another power back-off value that is greater than a threshold value when the backed-off transmission power exceeds the threshold value.

The processor (e.g., the communication processor 531 in FIG. 5) may receive, as the target key value, a key value mapped to a minimum or low power back-off value to back off the transmission power at a level equal to or less than the threshold value among the power back-off values mapped to the plurality of key values.

The processor (e.g., the communication processor 531 in FIG. 5) may receive, from the electronic device, a key value corresponding to each type of event detectable by the communication device and may back off, upon detection of the target event, the transmission power of the electronic device with a power back-off value mapped to the key value corresponding to the type of target event.

The processor (e.g., the communication processor 531 in FIG. 5) may maintain the transmission power of wireless signals transmitted through the antenna of the electronic device when not detecting the occurrence of the target event.

When detecting the release of the target event, the processor (e.g., the communication processor 531 in FIG. 5) may change the transmission power of the electronic device to transmission power before being backed off.

When the electronic device performs communication in a first frequency band among frequency bands accessible for wireless communication, the processor (e.g., the communication processor 531 in FIG. 5) may receive a first key value set for the first frequency band and when the electronic device performs communication in a second frequency band, the processor may store a second key value set for the second frequency band.

A method performed by a communication device (e.g., the communication device 530 in FIG. 5) according to an example embodiment may include storing a back-off table (e.g., Table 1) in which a key value is mapped to each power back-off value, transmitting the back-off table to an electronic device coupled to the communication device (e.g., the electronic device 520 in FIG. 5), receiving, from the electronic device, a target key value determined based on an expected power back-off value required upon the occurrence of a target event, and backing off transmission power of wireless signals transmitted through the antenna of the electronic device, based on power back-off value mapped to at least the received target key value in the backoff table when the occurrence of the target event is detected.

Power back-off values mapped to key values adjacent to each other in the back-off table may have a predetermined back-off value difference.

The expected power back-off value may be a value obtained by subtracting a threshold power aimed at satisfying the SAR standard corresponding to the target event from the transmission power.

When the transmission power identified by the electronic device exceeds the threshold power, the receiving the target key value may include backing off the transmission power, using power back-off values mapped to a plurality of key values.

The receiving the target key value may include backing off the transmission power based on one of the power back-off values mapped to the plurality of key values and further backing off the transmission power based on another power back-off value that is greater than the one power back-off value, when the backed-off transmission power exceeds the threshold power.

The receiving the target key value may include receiving, from the electronic device, a key value corresponding to each type of event detectable by the communication device. The backing off the transmission power may include backing off the transmission power of the electronic device with a power back-off value mapped to a key value corresponding to the target event upon detection of the target event.

The receiving the target key value may include receiving a first key value set for the first frequency band as the target key value when the electronic device performs communication in a first frequency band among frequency bands accessible for wire communication and receiving a second key value set for the second frequency bank as the target key value when the electronic device performs communication in a second frequency band.

An electronic device (e.g., the electronic device 520 in FIG. 5) according to an example embodiment may include a processor, wherein the processor receives a back-off table in which a key value is mapped to each power back-off value, calculates an expected power back-off value required upon the occurrence of a target event, calculates a target key value corresponding to the target event in the received back-off table, based on the calculated expected power back-off value, and transmit, to a communication device, the target key value for the communication device to back off the transmission power of wireless signals transmitted through the antenna of the electronic device with a power back-off value mapped to the target key value.

The processor may calculate, as the target key value, a key value mapped to a minimum power back-off value to back off the transmission power at a level equal to or less than a threshold power aimed at satisfying the SAR standard corresponding to the target event among power back-off values mapped to a plurality of key values in a back-off table.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of corresponding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A communication device comprising:
a memory configured to store a back-off table in which a key value is mapped to each power back-off value; and
a processor, comprising processing circuitry, configured to:
transmit the back-off table stored in the memory to an electronic device coupled to the communication device,
receive, from the electronic device, a target key value determined based on at least an expected power back-off value upon the occurrence of a target event,
back off transmission power of wireless signals transmitted through an antenna of the electronic device, based on power back-off value mapped to at least the received target key value in the backoff table when the occurrence of the target event is detected, and change, upon detection of a release of the target event, the transmission power of the electronic device to transmission power before being backed off.

2. The communication device of claim 1, wherein the each power back-off value comprises a plurality of back-off values and the key value comprises a plurality of key values, wherein the power back-off values mapped to key values have a predetermined back-off value difference.

3. The communication device of claim 1, wherein
the expected power back-off value is a value to be obtained by subtracting, from the transmission power of wireless signals transmitted through the antenna, a threshold value aimed at satisfying the specific absorption rate (SAR) standard corresponding to the target event.

4. The communication device of claim 3, wherein the processor is configured to back off the transmission power of wireless signals transmitted through the antenna, using power back-off values mapped to a plurality of key values.

5. The communication device of claim 4, wherein
the processor is configured to:
back off the transmission power of wireless signals transmitted through the antenna based on one of the power back-off values mapped to the plurality of key values and further back off the transmission power of wireless signals transmitted through the antenna based on another power back-off value that is greater than the one power back-off value when the backed-off transmission power exceeds the threshold power.

6. The communication device of claim 4, wherein the processor is configured to:
receive, as the target key value, a key value mapped to a minimum and/or low power back-off value to back off the transmission power of wireless signals transmitted through the antenna at a level equal to or less than the threshold value among the power back-off values mapped to the plurality of key values.

7. The communication device of claim 1, wherein
the processor is configured to:
receive, from the electronic device, a key value corresponding to each of a plurality of types of event detectable by the communication device and back off, upon detection of the target event, the transmission power of the electronic device with a power back-off value mapped to a key value corresponding to the type of the event.

8. The communication device of claim 1, wherein the processor is configured to:
maintain the transmission power of wireless signals transmitted through the antenna when the target event is not detected.

9. The communication device of claim 1, wherein
the processor is configured to:
receive a first key value set for a first frequency band when the electronic device performs communication in the first frequency band among frequency bands accessible for wireless communication, and receive a second key value set for a second frequency band when the electronic device performs communication in the second frequency band.

10. A method performed by a communication device, the method comprising:

storing a back-off table in which a key value is mapped to a power back-off value;

transmitting the back-off table to an electronic device coupled to the communication device;

receiving, from the electronic device, a target key value determined based on at least an expected power back-off value upon the occurrence of a target event; and backing off transmission power of wireless signals transmitted through an antenna of the electronic device, based on power back-off value mapped to at least the received target key value in the backoff table when the occurrence of the target event is detected, and changing, upon detection of a release of the target event, the transmission power of the electronic device to transmission power before being backed off.

11. The method of claim 10, wherein
power back-off values mapped to corresponding key values in the back-off table have a predetermined back-off value difference.

12. The method of claim 10, wherein
the expected power back-off value is a value obtained by subtracting, from the transmission power, a threshold power aimed at satisfying specific absorption rate (SAR) standard corresponding to the target event.

13. The method of claim 12, wherein the receiving the target key value comprises:
backing off the transmission power, using power back-off values mapped to key values when the transmission power identified by the electronic device exceeds the threshold power.

14. The method of claim 13, wherein the receiving the target key comprises:
backing off the transmission power based on one of the power back-off values mapped to the plurality of key values and further backing off the transmission power based on another power back-off value that is greater than the one power power-off value when the backed-off transmission power exceeds the threshold power.

15. The method of claim 10, wherein the receiving the target key value comprises
receiving, from the electronic device, a key value corresponding to each type of event detectable by the communication device and
the backing off the transmission power comprises
backing off, upon detection of the target event, the transmission power of the electronic device with a power back-off value mapped to a key value corresponding to the type of the event.

16. The method of claim 10, wherein the receiving the target key value comprises:
receiving, as the target key value, a first key value set for a first frequency value when the electronic device performs communication in the first frequency band among frequency bands accessible for wireless communication, and receiving, as the target key value, a second key value set for a second frequency band when the electronic device performs communication in the second frequency band.

17. A computer program stored in a non-transitory computer-readable storage medium to execute the method of claim 10, in combination with hardware.

18. An electronic device comprising
a processor configured to receive, from a communication device comprising communication circuitry, a back-off table in which a key value is mapped to each power back-off value, calculate an expected power back-off value required upon the occurrence of a target event, calculate a target key value corresponding to the target event in the received back-off table, based on the calculated expected power back-off value, and transmit the target key value to the communication device for the communication device to back off transmission power of wireless signals transmitted through an antenna of the electronic device with a power back-off value mapped to the target key value, and wherein the processor is configured to:

change, upon detection of a release of the target event, the transmission power of the electronic device to transmission power before being backed off.

19. The electronic device of claim 18, wherein the processor is configured to:

calculate, as the target key value, a key value mapped to a minimum and/or low power back-off value to back off the transmission power at a level equal to or less than a threshold value aimed at satisfying the specific absorption rate (SAR) standard corresponding to the target event.

* * * * *